No. 683,742. Patented Oct. 1, 1901.
G. E. FINCH.
PACK SADDLE.
(Application filed Feb. 11, 1901.)

(No Model.) 2 Sheets—Sheet 1.

Witnesses
Percy C. Bowen
Clarence A. Bateman

Inventor
George E. Finch
by Wilkinson & Fisher
Attorneys.

THE NORRIS PETERS CO., PHOTO-LITHO., WASHINGTON, D. C.

No. 683,742. Patented Oct. 1, 1901.
G. E. FINCH.
PACK SADDLE.
(Application filed Feb. 11, 1901.)
(No Model.) 2 Sheets—Sheet 2.

Witnesses
Percy C. Bowen
Clarence A. Bateman

Inventor
George E. Finch
by Wilkinson & Fisher
Attorneys

UNITED STATES PATENT OFFICE.

GEORGE E. FINCH, OF ST. LOUIS, MISSOURI.

PACK-SADDLE.

SPECIFICATION forming part of Letters Patent No. 683,742, dated October 1, 1901.

Application filed February 11, 1901. Serial No. 46,873. (No model.)

*To all whom it may concern:*

Be it known that I, GEORGE E. FINCH, a citizen of the United States, residing at St. Louis, in the State of Missouri, have invented certain new and useful Improvements in Pack-Saddles; and I do hereby declare the following to be a full, clear, and exact description of the invention, such as will enable others skilled in the art to which it appertains to make and use the same.

My invention relates to improvements in pack-saddles; and the object of my said invention is to improve the general efficiency of such saddles, as will hereinafter appear.

In order to more fully explain my said invention, reference will be had to the accompanying drawings, in which—

Figure 1:
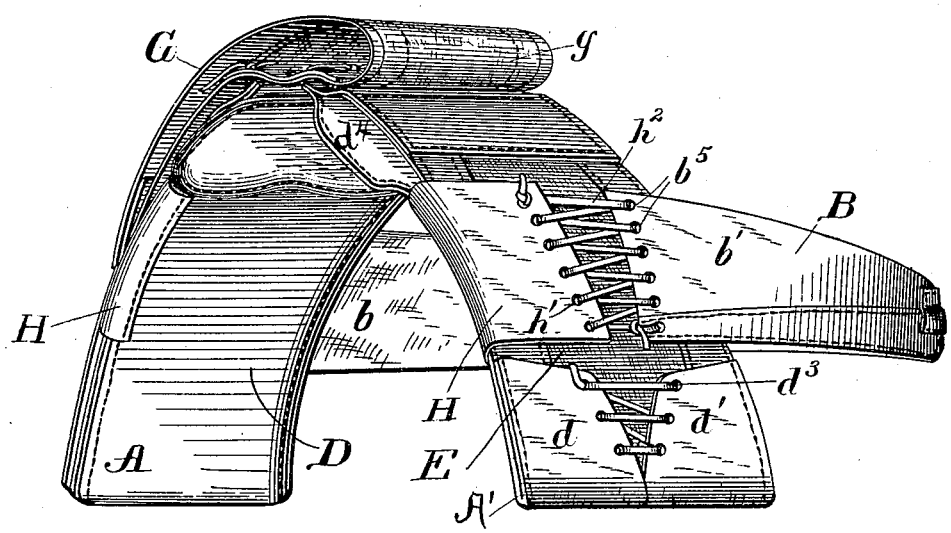
Figures 2, 3:
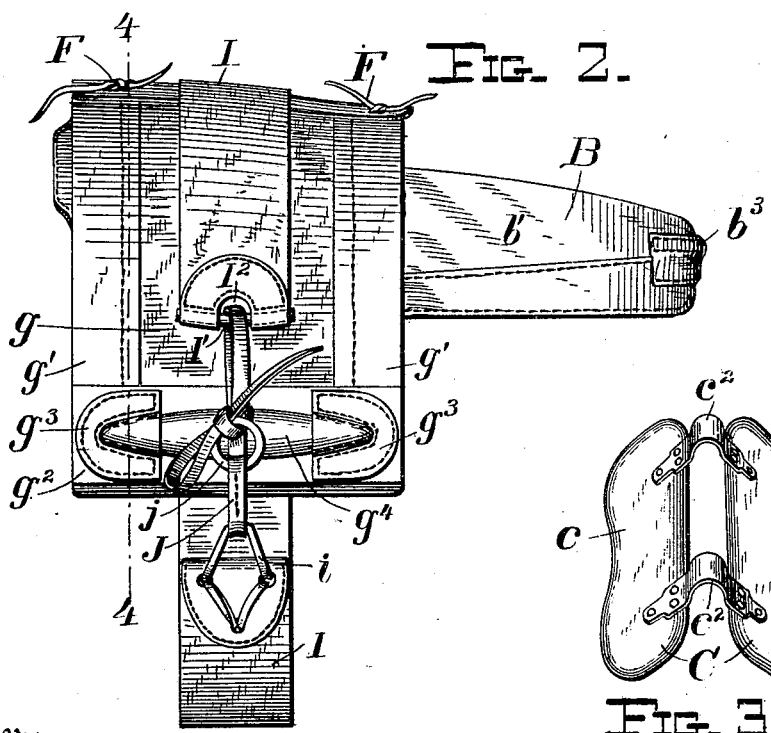
Figure 4:
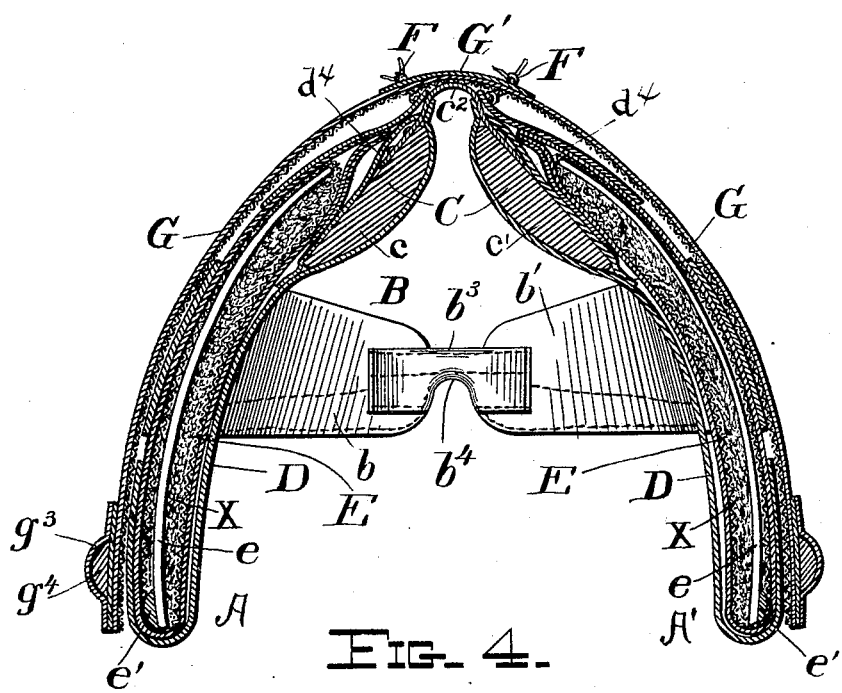
Figure 5:
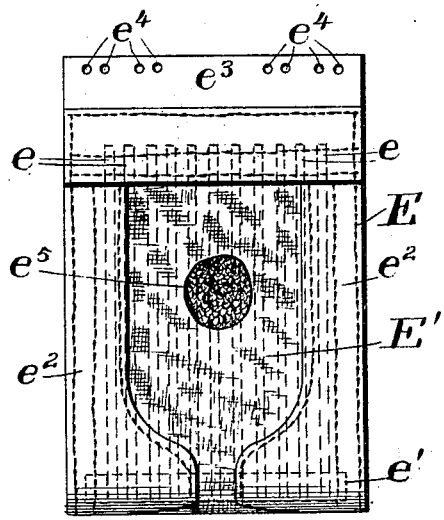

Figure 1 represents a perspective view of my improved saddle having one of the covers turned up to show the lacings. Fig. 2 is a side elevation of the same. Fig. 3 is a perspective view of the tree, showing the steel braces. Fig. 4 represents a vertical cross-section through the saddle on the line 4 4, Fig. 2, with the girth-strap removed; and Fig. 5 is a view showing one of the flank-pads removed, the stiffening ribs or sticks being shown in dotted lines.

The same letters refer to similar parts throughout the several views, in which the saddle is shown as comprising in general the two side portions or members A A' and the crupper B, forming a rearward extension. In the apex of the arch formed by the two curved side members is located a tree C, composed of two members $c\ c'$, connected by the braces $c^2$, preferably of steel, said braces being adapted to hold the two members $c\ c'$ in their correct relative position, so as to conform to the curvature of the animal's back. The said braces may be screwed, bolted, or fastened upon the parts $c\ c'$ in any suitable manner.

D D' are strips of leather which cover the inner sides of the two members $c\ c'$ of the tree, as shown in Fig. 4, and then pass down, forming the inner casing of each side portion of the saddle, and are turned up at the lower ends, being split into two parts $d\ d'$, leaving the V-shaped opening therebetween, a lacing strap or string $d^3$ being provided for the purpose of drawing these two separated parts $d\ d'$ together, thereby forming a pocket, the outer edges of said parts $d\ d'$ being stitched to the main portion D of said strip. The two members $c\ c'$ are covered on the outside by pieces of leather $d^4$, which are stitched to the pieces D and D' around the edges of the members $c\ c'$, thus forming what may be called the "inner casing" of the saddle.

E represents the side pads. These pads are provided with a plurality of stiffening ribs or sticks $e$, vertically disposed within said pads. These ribs or sticks $e$ have a curvature to approximate the curvature of the flanks of an animal, the shape of the saddle being thus retained under all conditions. The pad E preferably consists of a canvas bag E', padded with hay or other suitable material X, (visible through the opening $e^5$, Fig. 5,) reinforced upon its edges by the leather strips $e^2\ e^2$. Upon the top of said pad is sewed the leather piece $e^3$, provided with the holes $e^4\ e^4$. The pads are secured upon each side of the saddle by means of the lacing-strings F passing through the eyes $e^4$ and through the inner casing and outer covering of the saddle. The lower ends of these pads rest in the pockets formed in the side portions D, the same being held securely therein by means of the lacing $d^3$.

G is a covering for the sides of the saddle, provided with the leather reinforcing-piece G', through which the lacings F pass to secure the same to the inner casing of the saddle. This cover is preferably composed of a canvas strip $g$, provided with the reinforcing leather strips $g'\ g'$ upon the edges thereof. Upon each end of said cover are provided the leather pieces $g^2\ g^2$, overlapping the reinforcing-strips. Secured upon each of these pieces $g^2$ are a pair of retaining-pockets $g^3\ g^3$, stitched upon the piece $g^2$. Into these pockets the ends of a stiffening-stick $g^4$ are inserted to retain the same in position, one of such stiffening-sticks being provided upon each end of the cover G.

B represents the crupper, which is composed of the two members $b\ b'$, connected together at their rear ends by the connection $b^3$, provided with the cut-out portion $b^4$. Upon the opposite ends of these members $b\ b'$ are a series of eyes $b^5$. Located directly opposite to said ends are the flaps H H, each secured to the under side of one of the leather side pieces D. Each of the flaps is provided with the eyes $h'$, corresponding with the similar eyes $b^5$ upon the members $b\ b'$. Into these holes is threaded the lacing-string $h^2$, which completes an adjustable connection between the crupper and saddle.

I represents the girth-strap, provided at one end with the loop $i$ and at its opposite end with the pin $i'$, the end of said girth-strap being stitched back upon itself and the opening $i^2$ made therein to allow a strap to be passed around the said pin.

J is a strap provided at one end with a loop adapted to be inserted through the loop $i$ and have its free end pass through the opening $i^2$, thereby bringing the two ends of the girth-strap together. This strap J, as shown, is provided with a ring $j$, which passes through the loop at one end thereof, and to the ring is secured the free end of said strap after being passed through the pin upon the opposite end of said girth-strap.

By passing the girth-strap I completely around the body of the animal and over the saddle the said saddle is held securely in position from any loosening or shifting.

In order to place the saddle upon the back of the animal, the crupper and girth are disconnected or loosened, and the saddle is placed upon the back of the animal. The cover G upon each side is raised, and the crupper is adjusted by the lacing $h^2$ until it occupies its proper position. Said covers are then replaced, and the girth-strap I is passed around the animal and completely over the entire saddle. The saddle is now in readiness to receive the load, which may be secured to the saddle in any well-known approved manner.

Having thus described my invention, what I claim, and desire to secure by Letters Patent of the United States, is—

1. A pack-saddle comprising inner casings containing stiffening members and having pockets at their lower ends, cushions secured to the upper ends of said casings and extending into said pockets, means for lacing said pockets down upon said cushions, a crupper secured to said inner casings and a covering-piece secured at the top to said inner casings and cushions, substantially as described.

2. A pack-saddle comprising inner casings containing stiffening members and having pockets at their lower ends, cushions secured to the upper ends of said casings and extending into said pockets, curved vertical ribs within said cushions, means for lacing said pockets down upon said cushions, a crupper secured to said inner casings and a covering-piece secured at the top to said inner casings and cushions, substantially as described.

In testimony whereof I affix my signature in presence of two witnesses.

GEORGE E. FINCH.

Witnesses:
E. H. CHRISTMAN,
ELIGIO FUENTEL.